(12) United States Patent
Reichmuth et al.

(10) Patent No.: US 6,194,670 B1
(45) Date of Patent: Feb. 27, 2001

(54) ELECTRONIC BALANCE

(75) Inventors: Arthur Reichmuth, Wetzikon; Christain Klebe, Pfäffikon, both of (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/038,400

(22) Filed: Mar. 11, 1998

(30) Foreign Application Priority Data

Mar. 11, 1997 (CH) .................................................... 0569/97

(51) Int. Cl.⁷ .......................... G01G 19/22; G01G 19/34; G01G 23/01; G01L 25/00
(52) U.S. Cl. ......................... 177/25.13; 73/1.13; 702/101
(58) Field of Search ..................... 73/1.13, 1.15; 177/25.13, 50; 702/101, 102

(56) References Cited

U.S. PATENT DOCUMENTS

| | | | | |
|---|---|---|---|---|
| 3,997,769 | * | 12/1976 | Hansmann | 177/25.11 |
| 4,347,903 | * | 9/1982 | Yano et al. | 177/25.13 |
| 4,368,790 | * | 1/1983 | Ives | 177/50 |
| 4,493,384 | * | 1/1985 | Yano et al. | 177/25.13 |
| 4,529,050 | * | 7/1985 | Mosher et al. | 177/1 |
| 4,549,618 | * | 10/1985 | Kono | 177/25.13 |
| 4,583,605 | * | 4/1986 | Hirano | 177/50 |
| 4,610,323 | * | 9/1986 | Chenoweth et al. | 177/25.13 |
| 4,629,016 | * | 12/1986 | Knothe et al. | 177/25.13 |
| 4,754,822 | * | 7/1988 | Altenphol et al. | 177/145 |
| 4,760,539 | * | 7/1988 | Amacher et al. | 73/1.13 |
| 4,848,477 | * | 7/1989 | Oldendoef et al. | 177/50 |
| 4,909,338 | * | 3/1990 | Vitunic et al. | 177/50 |
| 5,056,050 | * | 10/1991 | Fuchs et al. | 702/101 |
| 5,058,422 | * | 10/1991 | Shimauchi | 73/1.13 |
| 5,074,368 | * | 12/1991 | Bullivant | 177/50 |
| 5,191,543 | * | 3/1993 | Berthel et al. | 177/50 |
| 5,243,545 | * | 9/1993 | Ormond | 702/102 |
| 5,308,931 | * | 5/1994 | Griffen | 177/50 |
| 5,321,634 | * | 6/1994 | Obata et al. | 702/101 |
| 5,625,170 | * | 4/1997 | Poris | 177/50 |
| 5,640,334 | * | 6/1997 | Freeman et al. | 702/101 |
| 5,661,268 | * | 8/1997 | Freeman et al. | 177/50 |
| 5,832,417 | * | 11/1998 | Petrucelli et al. | 702/101 |

FOREIGN PATENT DOCUMENTS 0424773  5/1991  (EP) .

OTHER PUBLICATIONS

Patent Abstracts of Japan, vol. 016, No. 243 (P–1364), Jun. 4, 1992 & JP 04 054418 A (Yamato Scale Co Ltd.), Feb. 21, 1992.

\* cited by examiner

*Primary Examiner*—Randy W. Gibson
(74) *Attorney, Agent, or Firm*—Friedrich Kueffner

(57) ABSTRACT

An electronic balance weighs one and the same load of an arbitrary amount repeatedly in a serial test from which it determines a statistical quantity, preferably the standard deviation. Based on this determination, it is possible to state the uncertainty of subsequent measurements at the actual location. It is advantageous to use as the test load the weighing sample itself, so that its effect on the random errors will be included in the uncertainty. When the uncertainty at a given confidence level is defined as a requirement, then the result of the test may serve to determine the minimum allowable sample weight.

23 Claims, 5 Drawing Sheets

```
----- REPRO CHECK -----
03.01.96              09:20:25

METTLER TOLEDO
TYPE:              PR5002
SNR:          1114051374
BAL:          YOUR ENTRY
REPROSET            GOOD 1                    1.11 g
2                    1.10 g
3                    1.10 g
n                         3
x                   1.103 g
s                   0.006 g
s REL                0.52 %

SIGNATURE:
       . . . . . . . . . . . . . . . . . .
─────────── END ───────────
```

```
- - - - - REPRO CHECK - - - - -
03.01.96                    09:20:25

METTLER TOLEDO
TYPE:                         PR5002
SNR:                      1114051374
BAL:                     YOUR ENTRY
REPROSET                       GOOD 1                             1.11 g
2                             1.10 g
3                             1.10 g
n                                  3
x                           1.103  g
s                           0.006 g
s REL                         0.52 %

SIGNATURE:

. . . . . . . . . . . . . . . . . . . . . . . . . . . .
━━━━━━━━ END ━━━━━━━━
```

FIG. 3

ELECTRONIC BALANCE

BACKGROUND OF THE INVENTION

1. Field of the Invention

The present invention concerns an electronic balance comprising a measuring transducer with a weighing pan and a signal processing module as well as an input unit and an output unit.

Factors that have an influence on the weighing results are the location where the balance is installed and the prevailing environmental conditions such as temperature fluctuations, vibrations, electrostatic fields, air drafts, etc., as well as the properties of the weighing samples themselves. Balances of more recent design are equipped with the capability to account for systematic measuring errors and to adjust the result values with a correction. An example of this is the automatic adjustment that takes place in a balance after the temperature has changed by a certain amount. Another example is the calibration of the balance at its actual location.

2. Description of the Related Art

From EP-B1 0424773, a precision balance is known in which the built-in and automatically activated calibration weight is applied and removed several times in succession for the purpose of determining the standard deviation. Each time, the measured value is registered and subsequently the standard deviation is calculated by the signal processing module and compared to a given reference value. If the calculated value is less than the reference value, then a new span calibration factor is calculated and stored in memory. On the other hand, if the calculated value is more than the reference value, the span calibration factor is not updated in memory, but the balance puts out a corresponding message. This known setup provides the capability to calibrate the balance and to determine the standard deviation, but only for the one load size of the calibration weight that is built into the balance. In addition, after an error message, it is necessary to check and restart the balance.

Even when known systematic measuring errors are taken into account, the result values are still subject to uncertainties due to systematic deviations that are known to exist but whose magnitude remains undetermined, such as a nonlinearity that cannot be ascertained at all or not with sufficient accuracy, or due to random uncertainties as may be caused by, e.g., a momentary air draft or by the uncertainty in the value of a correction of a systematic measurement error. The user of a precise electronic balance will be familiar with the inevitable dispersion of the weighing results. From the specifications of a balance, one can conclude the general magnitude of the errors to be expected, but when making an actual measurement, the user will hardly get an idea of its accuracy, because the specific influence factors at the user's location have not been taken into account. However, the user's broader concern is to know the measurement uncertainty of the actual weighing results obtained at the actual location and under the actual conditions.

SUMMARY OF THE INVENTION

The object of the present invention is to provide an electronic balance that, at the actual place where the balance is installed, will give an indication of the degree of accuracy that can be achieved in measurements under the given conditions and, notably, for an arbitrary amount of weight anywhere within the entire measuring range of the balance.

The object is accomplished in an electronic balance that has a measuring transducer with a weighing pan and a signal processing module with the capability to access previously stored data and store new data, as well as an input unit and an output unit. As the distinguishing inventive feature, the signal processing module

- initiates and controls a process in which one and the same weighing load of any arbitrary amount within the measuring range of the balance is repeatedly put on and taken off the weighing pan,
- calculates from the resulting series of measuring values a statistical quantity, and
- delivers an output of the result of the calculation and/or retains it for use in subsequent measurements.

It needs to be mentioned that certain terms in the following explanation will be used with specific meanings. Accuracy is a common term that intuitively conveys the idea of a reliable representation of even minute values or differences, but otherwise has no definition. Depending on the purpose of a measurement, the term "accuracy" can stand, e.g., for absolute or relative measurement uncertainty or for repeatability. The measuring result or final outcome of a measurement is the most probable value that one can assign to the quantity being measured. The measurement uncertainty is the measure for the amount of dispersion of the values that can reasonably be ascribed to the measuring result. Repeatability in the field of weighing is defined as the empirical standard deviation or repeatability standard deviation of a sample of successive weighings of the same load. Additional terms will be explained at the point where they occur in the text.

The balance according to the invention makes it possible not only to determine a statistical quantity such as the standard deviation for a weighing load, but it also offers a simple way of determining the upper and, more importantly, the lower limit of the load range within which the balance will operate at the desired level of accuracy. Consequently, it is possible to determine the entire load range in which a balance is capable of operating with the desired or prescribed accuracy in such a manner that the influence factors at the actual location, such as vibrations of varying magnitude, air pressure and ambient temperature, are taken into account. This makes it possible in a general sense to determine the range of accuracy at which the balance is capable of operating at its actual location and with a given kind of weighing sample.

The determination of the statistical quantity, or of the associated accuracy range, occurs at the command of the user when the situation requires it, e.g., after the balance has been relocated or after a major change in the weather. But the criterion for initiating the determination may also be programmed in the balance itself or through the input unit, e.g., it may be programmed to initiate the determination at regular time intervals. The determination consists of a series of weighings of one and the same test load. The load does not have to be known, except that it needs to be within the weighing range of the balance. The weighing sample itself may serve as the test load. The source of the measurement uncertainty is not in the balance alone; the properties of the weighing sample, too, make a contribution. Thus, it makes sense to take the influence of the weighing sample into account. The signal processing module initiates the process of repeatedly applying and removing the test load. This may take place in the form of an instruction to the user through an appropriate output device such as a display message or an acoustic command that the user executes, be it that he himself puts the test load on the weighing pan or that he activates an automated device.

Further possibilities are available if more than one statistical quantity is taken into consideration. By taking into account higher moments of the distribution of the measurement sample values, it is possible to check the validity of, or even to modify, the model distribution that was assumed in the calculation and thus to enhance the informative value of the results.

A proposed value (default value) for the number of repetitive cycles (loading and lifting the weight) may be stored internally, but the interactive user program of the balance also allows for the number of cycles to be entered by the user. In addition, the user can select certain parameter settings on the balance such as the filter strength for smoothing the measurement values in the presence of vibrations or the interval of the stability-checking feature for the release of the weighing result; thus, the user is given a means to optimize the balance parameter settings for the location and for the given kinds of weighing samples. This process is also called setting the configuration parameters of the balance, or configuration for short. With a displayed message or a printed record, the configuration of the balance can be indicated and the current level of accuracy can be communicated to the operator. Thus, the operator is able to ascertain at any time that the balance provides adequate accuracy in the currently used weight range. The balance does not stop operating when the calculated statistical quantity exceeds a preset threshold, but allows the operator, by using a somewhat larger sample weight, to find the point at which the statistical quantity will stay just below the given threshold value. Consequently, the operator is always able to determine the minimum sample weight at which the critical statistical quantity clears the preset threshold. If more than one quantity is calculated and taken into account, this trial-and-error method becomes unnecessary because the minimum sample weight can be directly determined.

As the number of measurement values is increased, it can be estimated with a greater degree of certainty how many additional measurements it will take to attain a given repeatability standard deviation, provided it is attainable at all. This estimate can save time by breaking off a measurement series before completing a given number n of weighings, be it that the desired level of repeatability has already been verified or that it has been found to be unattainable. By providing an output of the result, the operator can be informed and prompted to take appropriate measures such as a change of the configuration.

The measurement series allows the random fluctuation of the measurement values under the prevailing conditions to be entered into a computation that is based on the probability density function of the measurement values; in addition, the computation may take systematic measurement deviations into account. Thus, given the values of those parameters that are characteristic for the model of the probability density function, the data of interest in the specific application can be calculated and put to appropriate use further on or delivered as an output. Consequently, based on the empirical standard deviation that was calculated from the measurement series, the uncertainty associated with a given confidence level or, vice versa, the confidence level associated with a given uncertainty can be calculated for any individual weighing. With specified values given for both the relative uncertainty and the confidence level, it is possible to determine the minimum allowable sample weight that will be compatible with the given requirements under the prevailing conditions. It is further possible, with a given confidence level and a given uncertainty—or a given relative uncertainty and the current weight value—to determine the required repeatability and to compare it against the previously computed empirical standard deviation. The actual operating mode can be either preset or selectable. The invention provides in particular for the confidence level or the uncertainty or both parameter values to be selectable through the input unit.

For the computations, it is advantageous to assume a model for the probability density function of the measurement values based on what is known about the random characteristics of the underlying process. The model may also take systematic errors into account. Through an analysis of the measurement series, it is possible to validate the model based on the calculated statistical quantities. If the analysis does not confirm the assumptions, it is conceivable to adapt the model.

The systematic errors, to the extent that they are quantifiable, are taken into account by applying a correction to the result. The non-quantifiable portion, on the other hand, is again of random character and enters into the computation as a random quantity with a probability distribution based on an assumed model. If no other information is available, the quantitative reference data are taken from the performance specifications that may be stored in the balance itself for this purpose. Alternatively, data from production tests may be used. As a further possibility, the aforementioned stored data may be adjusted on the basis of measurements made on location, e.g., by making a small change in the correction factor for a quantifiable portion and reducing the variance for the non-quantifiable portion.

BRIEF DESCRIPTION OF THE DRAWING

The invention is explained in closer detail through illustrated examples. The figures in the drawing represent:

FIG. 3: A possible format for the printed record of the determination of the accuracy range with a sample of measurement values;

DETAILED DESCRIPTION OF THE INVENTION

Figure 1:
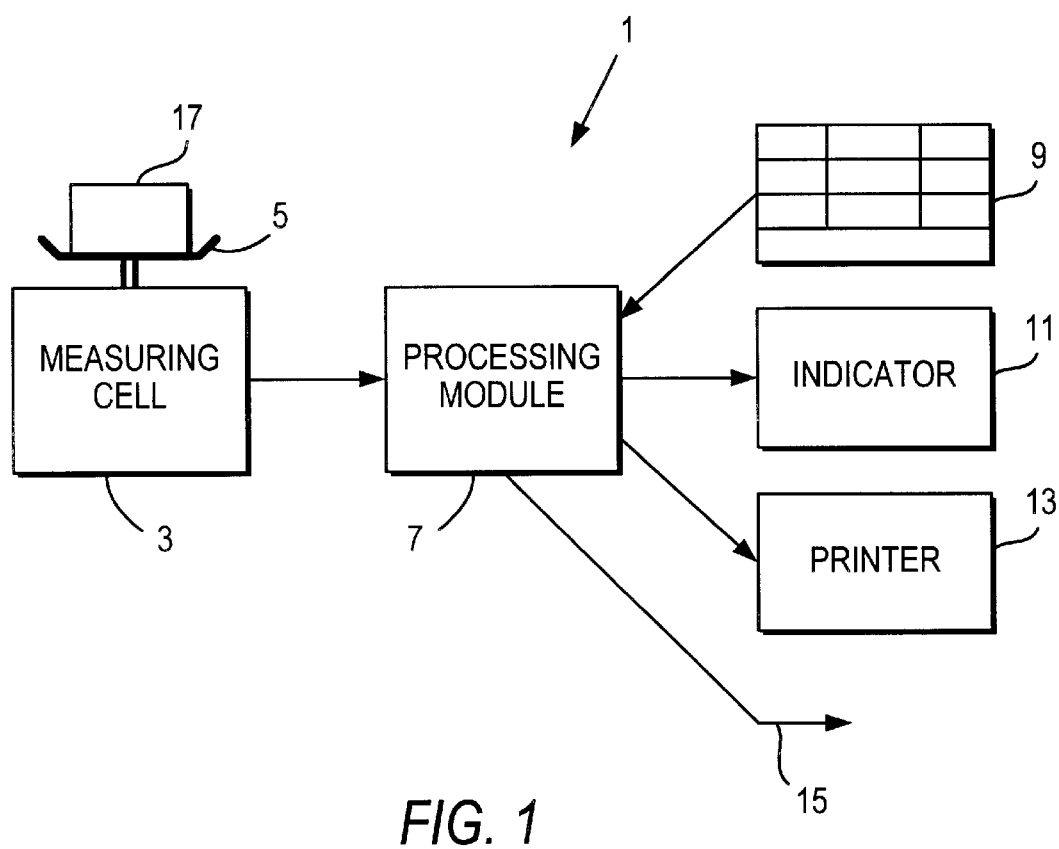
FIG. 1: Block diagram of a balance.

The block diagram of a balance 1 that is represented in FIG. 1 comprises a measuring cell 3 with a weighing pan 5 holding the weighing sample 17. Of course, the customary term "weighing pan" in this context is not restricted to pan-shaped load receivers; platforms, bowls or other receptacles are also included. The signal that is generated in the measuring cell 3 and that corresponds to the weight of the weighing sample 17 is transmitted to a signal processing module 7. The signal processing module 7 is equipped to accept operator input through a keyboard 9 and to communicate to the operator through an indicator unit 11 the measuring result and other information concerning the status of the balance 1. Beyond this level of equipment of a balance, there may also be a printer 13 connected to the signal processing module 7, and the signal processing module 7 may contain an interface for transmitting data through a data connection 15 to other data processing units. Further, through an appropriate design of the interface or through an additional interface, other input modes may be provided in addition to or in place of the keyboard 9, for example for voice or computer input. In addition, the signal processing module has the capability to retrieve and to store data in memory that resides either in the signal processing unit itself or in another medium that is accessible through data connection 15.

Figure 2:
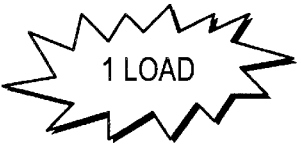
FIG. 2: The sequence of steps for determining the repeatability of a balance.

As one possibility for determining a statistical quantity, FIG. 2 illustrates the interactive user program for finding the repeatability of weighings made at the actual location of the balance 1. By pressing the key labeled "Repro", the checking mode is called up. Next, the indicator unit 11 displays the stored default value n of the number of weighings (FIG. 2b). Now the operator has the choice of either confirming the default value n by pressing the "Enter" key or entering a number of his own choosing through the keyboard 9 and confirming it with the "Enter" key. Subsequently, the balance prompts the first loading of the weighing sample, e.g., by means of a blinking display message or acoustically (FIG. 2c); then the blinking display of "0.00 g" requests the weighing sample to be removed (FIG. 2d). The steps 2c and 2d will now be repeated (n−1) times. If the desired repeatability has been confirmed before completing the selected number n, the series may be terminated by pressing "Exit". Likewise, the series of measurements can be broken off if the wrong sample has been loaded by mistake, or for other reasons, e.g., if the measurement values registered up to this point indicate that the desired repeatability is not attainable under the prevailing environmental conditions and with the current configuration settings of the balance 1.

Any kind of object may serve as the test load that is placed on the weighing pan 5 as long as its mass is within the weighing range of the balance 1. The preferred choice is for a load that corresponds essentially to the one that is subsequently to be exactly weighed on the balance or a load that is close the lower limit of the weighing range,—in other words, close the minimum allowable sample weight. Particularly, rather than substituting a representative test weight, it can be advantageous to use for the determination the weighing sample 17 itself (e.g., a beaker, a container, a receptacle, a filter element, a work piece, etc.). By using the object itself that is to be weighed, the balance test will be representative of the practical application. The point is that influence factors on the repeatability that are caused by the weighing sample will thereby be included in the determination.

No later than after completing the n weighings, the balance will indicate the result of the measurement series, produce a printed record or transmit the data to an appropriate peripheral device. FIG. 2e shows a possible format for displaying the results on the indicator unit. The number n=3 of measurements that have been performed is shown on the left, and the calculated standard deviation s=0.006 g is shown at the center.

Additional data may be provided, e.g., with a printer. FIG. 3 shows a possible layout for a printed record. In addition to giving the date and time, the illustrated record identifies the balance by type and serial number and contains a space for a freely selectable text entry.

Further, in the field labeled "ReproSet", the setting of the stability-checking feature of the balance is documented. This is followed by a listing of the three individual weighing results, the number of weighings (n=3), the mean value (x=1.103 g), and the standard deviation (s=0.006 g) of the series of measurements. The standard deviation in proportion to the mean value, $s_{rel}$=s/x (also known as relative standard deviation, relative repeatability, or coefficient of variation) appears on the last line (s rel=0.52%).

From the sample record in FIG. 3, it can be concluded that samples of the same type and weighing at least 1.1 g can be determined with a relative repeatability of ≦0.052%. Consequently, the operator is able to determine at any time, particularly before starting an extended series of measurements, the relative standard deviation or another statistical quantity, preferably by using the sample load itself, and thereby to receive an immediate answer as to whether or not the measurements can be performed with the required accuracy within the desired measuring range. Other statistical quantities besides the standard deviation that is shown in the example can be the following functions: mean value, minimum, maximum.

Further functions of pertinent interest are the third and fourth moments of the distribution of measurement values, also expressed through the dimensionless coefficients of skewness and kurtosis because these quantities provide a good basis for approximating the distribution function or for validating an assumed distribution model. Thus, e.g., for symmetric distributions the skewness will have to vanish, and for normal distributions the moment coefficient of kurtosis will have to equal 3. The distribution function is relevant in that it determines the relationship between the confidence limits and the corresponding confidence levels, i.e., in cases where it is important to know the statistical certainty for the range of given or calculated values.

Besides the at least one statistical quantity, it is possible to provide a display or other output of configuration parameters, such as the setting of the stability-checking feature in the example of the printed record. Information of this type is helpful for general orientation in evaluating a result or in making a change in the configuration of the balance, if necessary.

The repeatability depends on the configuration of the balance. Thus, e.g., if a very small repeatability standard deviation is attained at a favorable location with a low level of vibrations, the effectiveness of a vibration filter and of the stability-checking feature may be set lower, which will result in faster weighing. Therefore, depending on the result of the repeatability calculation, the signal processing module may initiate a change in the configuration of the balance by either presenting a recommendation through the output unit to the operator or automatically adjusting the configuration settings of the balance.

Figure 4:
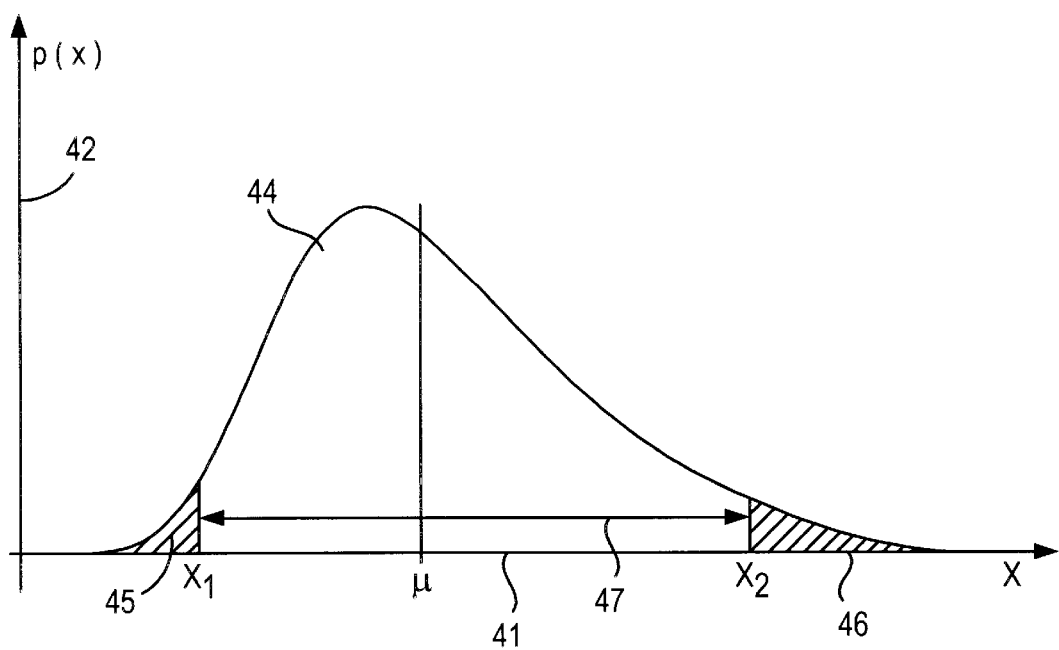
FIG. 4: A probability distribution model representing a series of weighings performed under repeatability conditions.

The balance according to the invention further has the capability to provide information concerning the uncertainty or the confidence level of an individual weighing, the desirable level of repeatability or the minimum allowable sample weight. The basis for this is found in statistics. The aforementioned parameters and the relevant relationships between them are explained by means of FIG. 4, which shows the diagram of a model distribution of a series of weight values measured in a repeatability experiment. It represents the theoretical distribution of the population of all possible results obtained when the same measurement is repeated under identical conditions (repeatability conditions). Above the measurement values x on abscissa 41, the probability density p is plotted in the direction of the ordinate axis 42. The probability density function p(x)—also known as density distribution or simply as distribution (p(x) of a random variable x)—is characterized by the variance, i.e., the mean value of the squared deviations of the measurement values from the arithmetic mean value $\mu$. In the illustrated example, $\mu$ does not coincide with the peak of the distribution curve. The function p(x) may be determined by additional parameters. The probability that a measurement value x lies in a range between $x_1$ and $x_2$ (with $x_1<x_2$) corresponds to the non-shaded area 44. It may be calculated from the probability function P(x), which is expressed by $$P(x_i) = \int_{-\infty}^{x_j} p(x)dx$$

For the total area below the curve, P(x) equals 1. The shaded area on the left represents the probability $P(x_1)$ that a measurement value will be less than $x_1$, and the shaded area on the right represents the probability $1-P(x_2)$ that a measurement value will be greater than $x_2$.

If there is a given requirement that only a specified small portion $P_1$ of the population of measurement values is to fall below a certain value, the so-called lower confidence limit (e.g., in the diagram at $x=x_1$) is obtained from the distribution p(x) or the corresponding probability function P(x) by solving the equation $P(x)=P_1$ for the unknown x. The analogous procedure is used for the upper confidence limit: Given a specified small portion $1-P_2$ of the population of measurement values to fall above a certain value, the upper confidence limit (e.g., in the diagram at $x=x_2$) is obtained by solving the equation $P(x)=1-P_2$ for the unknown x. The interval 47 between $x_1$ and $x_2$ is called the confidence interval; the probability that a measurement value falls within this interval—represented by the non-shaded area in FIG. 4—is called the confidence level. Another term that is used in this context is the probability of occurrence P 32 $1-\alpha$, where $\alpha$ stands for the sum $P_1+(1-P_2)$ of the two probabilities that lie outside the confidence interval, i.e., the shaded areas 45 on the left and 46 on the right. The measurement uncertainty was defined above as the measure for the dispersion of the values that may reasonably be assigned to the measurement result. In the case of a simple measurement series for the determination of the most probable value, as in the present example, the measuring result or (adjusted) final value for the measurement is the mean value. The dispersion can be seen from the distribution of values. Customarily, the difference between the mean value and the confidence limit is called uncertainty.

Determining the confidence limit in this manner simultaneously sets the confidence level as $1-P_1-(1-P_2)=P_2-P_1$. Thus, the confidence level and the confidence limits are firmly tied together by the distribution function which, in turn, is characterized by the variance. If the confidence limits are given as absolute quantities, e.g., as limit values in fill-weighers, and if a certain confidence level is prescribed, this will put a constraint on the distribution function and thus indirectly on the variance. The variance of a random sample of measurement values out of the population that forms the basis for the model distribution converges by probability into the variance of the population and, correspondingly, the empirical standard deviation s—being the positive square root of the variance of the random sample—converges into the standard deviation $\sigma$. Thus, from an observed empirical standard deviation, i.e., from the repeatability, one can draw conclusions about the underlying distribution; and the greater the random sample (i.e., the number of measurement values), the higher the certainty of the conclusion. For small random samples, an adequate test for significance and appropriate corrections are recommended. With some mathematical effort, it is possible to determine the repeatability needed to meet requirements, based on specified confidence limits, a specified required level of confidence and a knowledge of the characteristics of the distribution. Or, to express the same idea in another way: If with an assumed model of the probability density function the parameters confidence level and uncertainty—or the upper and lower uncertainty in an asymmetric situation—are given, whereby the confidence limits are defined at the same time, then the variance along with its square root, the standard deviation, is implicitly determined and can be calculated. This value for the standard deviation represents the requirement for simultaneously achieving the given uncertainty and the given probability of occurrence; and by comparing it to the repeatability that was actually achieved in the measurement series, one obtains a reference as to whether and how well the balance is capable of meeting the given requirements. The result of the comparison may be a simple statement such as "Repeatability is smaller/larger than required" or "Pass/Fail", but it could also be in the form of a numerical ratio between the empirical standard deviation and the required standard deviation. If the relative uncertainty is a fixed given quantity, the result of the comparison will depend on the magnitude of the respective sample weight. Thus, for each individual weighing it is possible to determine whether the result of the comparison is satisfactory.

Thus, the signal processing module of an appropriately equipped electronic balance that is programmed with a model of the probability density function, is provided with the capability to calculate dependent unknowns from the previously determined statistical quantity, preferably the empirical standard deviation, and from given parameter values. The parameter values may be derived from specification data stored in the balance, from factory measurements, or from measurements that were performed on location. As an additional possibility, the parameter values could be set through the input unit. The derived or set parameter values as well as the calculated values can be indicated, printed, or otherwise represented through the output unit.

A model may be represented through a series expansion of the moments of the distribution function. By determining several statistical quantities, particularly the higher moments, from the measurement series, the balance is enabled to check how well the actual distribution of the measurement values conforms to the assumed model. The result of this kind of verification, may be shown as a display indication and may provide the basis for modifying the model, to name one example. But it is also possible to modify the model directly, e.g., by using the series expansion of the moments for calculating the distribution function.

The distribution of measurement values in technical applications can often be represented with good approximation through the model of the Gaussian distribution (also called normal distribution). Its main characteristics are that it is symmetric relative to the mean value and the fact that it is completely determined by the two model parameters mean and variance. If a quantity is the result of a plurality of random events that are entirely or to a large extent independent of each other, then the frequency distribution of the resultant quantity also converges rapidly into the normal distribution, even if the individual processes by themselves are not following a normal distribution.

For the normal distribution, the relationship between the standard deviation and the confidence level is well known. For confidence limits symmetric to the mean at $\mu\pm\sigma$, the confidence level is 0.683, at $\mu\pm2\sigma$ it is 0.955, and at $\mu\pm3\sigma$ it is 0.997. For electronic balances of high accuracy, a high level of confidence with confidence limits symmetric to the mean is customarily required, and the uncertainty is generally set at $\pm3\sigma$, unless a different value is specifically stated.

Knowing these relationships, the balance according to the invention provides the capability to determine and retain the specific information concerning a measurement at the actual location and under the actual conditions. The measurement series of loading and lifting a freely selectable weighing load provides the empirical standard deviation (also called repeatability in this context) in addition to a mean value representing the measuring result. For this kind of measurement, an assumed normal distribution represents a good approximation. No further information is needed to perform the subsequent calculation. If necessary, a test for significance may be performed. For any subsequent weighing of a mass of the same order of magnitude as the load in the repeatability experiment, the uncertainty associated with a given confidence level can be directly determined.

As an example, let m be the measuring result for the weighing, s the standard deviation from the repeatability determination, and P the required probability of occurrence, i.e., the level of confidence. The complete display indication for an individual measurement close to m will now have the form $m_i \pm U$ at P=y%. For example, let s=0.006 g, $m_i$=1.103 g, and P=95.5%. The latter is attained in a normal distribution when the uncertainty equals $2\sigma$. Assuming a sufficient level of statistical certainty, $\sigma$ may be equated to s. Thus, the uncertainty equals 2s. The display indication for the weighing load in the example is therefore "1.103±0.012 g at P=95.5%". This makes it evident that a good repeatability, meaning a small s, contributes to a more reliable result—the uncertainty or the tolerance that needs to be allowed will be correspondingly smaller.

Vice versa, if the allowable uncertainty is given, e.g., as U=10 mg, this corresponds to a confidence limit at $x_2$=U/s=1.67 in the normal distribution, for which a value of P=0.905 is obtained from the probability function. Consequently, the display will show a set of information of this or a similar form:

"1.103 g, meeting specified ±0.01 g with P=90.5%"

Given the requirement to maintain a specified confidence level for a specified uncertainty, the repeatability has to be correspondingly small. This type of specification may serve to limit the number of weighings in the determination of the empirical standard deviation. If, in analogy to the examples above, a confidence level of P=99.7% ($3\sigma$ level) is required for U=10 mg, then s may not exceed 3.33 mg.

For distribution models other than the normal distribution, the preceding discussion and conclusions are applicable by analogy. However, in certain cases it may be necessary to specify additional quantities, e.g., two uncertainties with their respective confidence limits in the case of asymmetry. When the required number of values is given, the value of the unknown quantity that is of interest in the particular situation can be determined.

If a weighing load of constant physical properties could be weighed repeatedly on an ideal balance, there would nevertheless be a certain dispersion of the measured values caused by independent influence factors of a random nature, such as a fluctuating gravity field, air drafts or the like. These random deviations of the measurements have an empirical standard deviation $S_A$. The latter is increased if the weighing load itself is subject to random variations, e.g., because it can absorb and/or give off gases or because it contains components that are in motion. An actual balance inherently contributes random components to a measurement value, which are also to be included in $s_A$. Components of this type may be caused, for example, by vibrations of the supporting surface or by imperfections in the measuring cell, particularly noise of a reference source, analog/digital conversion noise, or noise in the electromagnetic force compensation itself. All of these random factors manifest themselves in the result of the random sample test. They contribute to the measurement uncertainty a statistical component $U_A$, the so-called type A uncertainty.

This uncertainty, beyond the extent to which it is caused by the balance itself, is to a significant degree determined by the properties of the weighing load. Thus, for example, a hygroscopic or a highly volatile substance can cause a large dispersion of the measurement values. In such a case it is reasonable, not to say essential, to also take the effect of the weighing load into consideration. It would be incorrect to base the determination of the uncertainty only on the properties of the balance. One advantage of the balance of the present description is the fact that all components can be included simultaneously in the determination.

In addition to the statistical component $U_A$, there are contributions caused by known but non-quantified systematic deviations as well as contributions caused by systematic or random uncertainties of corrections that are being applied to the measurement values. For example, the temperature-related effects may be measured during the manufacture of a balance, and one or more factory parameter values may be stored to be used in a correction function during the operation of the balance. However, at the user location the balance may react differently, due to possible temperature differences between the interior of the balance and the environment, or the temperature sensor may give fluctuating results. In addition, there are unknown differences between the actual temperature response function and the modeled correction. Estimated contributions of this type, which are based on considerations other than a statistical analysis, also enter into the measurement uncertainty and will hereafter be designated as $U_B$, the so-called type B uncertainty. The two components $U_A$ and $U_B$ are, as a general rule, independent of each other. If, in addition, both are based on the same confidence probability, they can be combined into an overall uncertainty that is calculated as the square root of the sum of the squares.

The possible effects of systematic deviations such as the non-linearity, the eccentric load sensitivity, the temperature dependence of the sensitivity, or the inaccuracies in the calibration are stated in the specifications for the respective type of balance. Specifications are quantitative statements concerning the performance of the balance and, as a rule, apply to every individual unit of a given type of instrument. If the specifications are stored in the balance itself or if they are available through a data transmission, they may serve to estimate the contribution $U_B$ and may enter into the calculation of the uncertainty. However, it would be better to have the capability to work with parameters that are specific to the individual balance. This is possible if the individual quantities from factory and service measurements are stored so that they are subsequently available to the balance. Factory parameters are quantitative data concerning the performance of the balance that have been measured for the individual instrument in the course of the manufacturing process. Even better results are obtained if the conditions prevailing at the actual location shortly before or after the time of the weighing are allowed to enter into the determination of $U_B$. Thus, as an example, it is conceivable to determine from several series of measurements the differences in the indicated results that occur when the load is placed at different specified places on the weighing pan, from which one can draw conclusions about the eccentric loading effect. The magnitude of the effect can be figured into $U_B$ as the value that applies to the specific balance at the current time. If the eccentric loading effect turns out to be too large, a possible consequence could be that the balance displays an instruction that the loads must always be put within the same narrowly confined area on the weighing pan. Or the information may be used in subsequent measurements together with data about the placement of the load to make a correction in the measurement value. But not only the contributions from the systematic measurement deviations can be derived from different sources, i.e., measurements on location, measurements at the factory, or retrieval of stored specifications; the same also applies to the determination of parameter values that are connected with the model of the probability density function.

The uncertainty is thus composed of several components that are in varying degrees dependent on the size of the load. Depending on the application, the absolute amount of the uncertainty may be of less concern than the uncertainty in proportion to the amount being weighed, i.e., the relative uncertainty u. The latter is defined as $u=U/m_i$. It is customarily stated as a percentage. The attainment of a specified relative uncertainty gets more difficult the smaller the weighing load—therefore, the deciding factor in this case is the constant portion of the uncertainty. On the other hand, the load-dependent sources of uncertainty pose a limit to how small the relative uncertainty can get even in the case of large loads. The load-dependent portion may be disregarded in the determination of the minimum allowable weighing load as long as the specified requirements are appropriate. However, if a measurement series is performed with a weight that is far above the minimum allowable weighing load, and if, in addition, the targeted relative uncertainty is not orders of magnitude larger than the proportionality factor of the load-dependent uncertainty, then the latter cannot be summarily disregarded. In this case it is recommended to perform an additional series of measurements with a significantly different weight and to calculate the minimum allowable weighing load by extrapolation. As a first approximation, the uncertainty could be stated, for example, as the sum of a load-proportional term and a constant.

For the measuring result in the example above, a mean value was calculated in the amount of x=m=1.103 g with an empirical standard deviation of s=6 mg. If there is a specified requirement that the relative uncertainty is not to exceed the limit of 1% at a confidence level of P=95.5% (interval ±2σ), i.e., $u=10^{-2}$, a simple calculation immediately determines the minimal allowable sample weight that still meets the requirement: $m_{min}=U/u=2s/u=0.012/10^{-2}=1.2$ g. This is without taking into account the contribution from systematic deviations.

Figure 5:
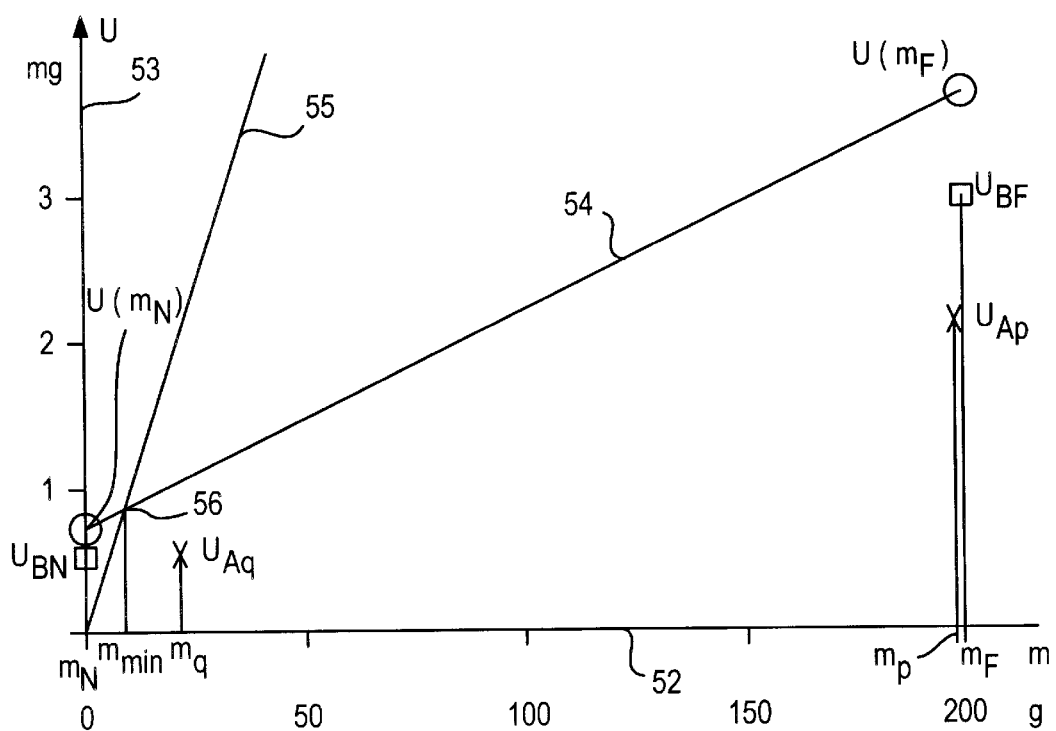
FIG. 5: An explanatory graph for calculating the minimum allowable sample weight.

As another example, on a high-accuracy balance of 200 g capacity, a first test provides a value pair of $m_p=198.543$ g for the mean and $s_p=0.70$ mg for the repeatability (empirical standard deviation). Specifications and factory measurements provide the information that for known but non-quantified systematic deviations at a confidence level of P=99.7%, an uncertainty contribution of 3.0 mg is to be assigned for full-capacity loads and of 0.6 mg for small loads. For the purpose of this example, it is further assumed that a maximum relative uncertainty of 0.01% at a confidence level of P=99.7% is required. The uncertainty for $m_p$, based on the foregoing, amounts to 0.0018%, as calculated from the equation $$U_p \approx \sqrt{(k \cdot s_p)^2 + U_{BF}^2} = 3.67 \text{ mg},$$

where k=3. An analogous calculation as in the preceding example would indicate a minimal allowable sample weight of 36.7 g, which is too high, given that a further test series produces a value pair of $m_q=21.337$ g for the mean and $s_q=0.18$ mg for the repeatability standard deviation. FIG. 5 explains how to determine the minimum allowable sample weight in the given situation more reliably with the help of this additional information. The abscissa 52 contains the measuring range of the balance extending from zero load $m_N$ to full capacity load $m_F$; the uncertainties $U_i$ are plotted in the direction of the ordinate axis 53. The type B uncertainty $U_B$ at zero load $m_N$ is designated as $U_{BN}$, amounting to 0.6 mg in the example. The type B uncertainty $U_F$ at full capacity load $m_F$ is designated as $U_{BF}$ and amounts to 3.0 mg. At the tested loads $m_q$ and $m_p$, the associated type A uncertainties are shown as $U_{Aq}=k \cdot s_q=0.54$ mg and $U_{Ap}=k \cdot s_p=2.10$ mg, calculated as k times the respective empirical standard deviations, where k=3. The unknown quantity to be determined is a line graph for the combined uncertainty U(m) so that $m_{min}$ can be determined as the threshold at which the condition u≧U(m)/m begins to be met. In a first approximation, $U_A(m)$ and $U_B(m)$ can each be calculated for any point by linear interpolation between the known values. There are alternative calculation methods if more reliable information is available, particularly if there are more known values. In any event, U(m) is now calculated as the square root of the sum of the squares of $U_A(m)$ and $U_B(m)$. Curve 54 in FIG. 5 represents the resulting expression $U(m)=[U_A(m)^2+U_B(m)^2]^{1/2}$. The deviation from a straight line is very small. Thus, it may indeed be sufficient to use a linear approximation for U(m) itself. The key issue is to be able to capture and take into account the overall tendency of the uncertainty function over the entire range, as the balance according to the invention has the capability of doing. The curve 55—a straight line—represents the relationship $U_g(m)=u_g \cdot m$, where $u_g=0.01\%$ is the specified relative uncertainty that must not be exceeded. The two functions $U_g(m)$ and U(m), represented by the curves 55 and 54, intersect at point 56, the abscissa value of which represents $m_{min}$. The calculation provides the result for the minimum allowable sample weight as $m_{min}=8.17$ g.

Thus, relying on the statistical data obtained from two measurement series permits a simple and accurate determination of the minimum allowable sample weight that is compatible with specific given requirements. The relative uncertainty and the confidence level are entered in an appropriate manner through the input unit.

What is claimed is:

1. An electronic balance with a measuring transducer for providing measurement values within a specified weighing range, a weighing pan for supporting an object to be weighed, a signal processing module capable of accessing previously stored data and storing new data, an input unit and an output unit; comprising the improvement that the signal processing module comprises means for storing parameter values related to statistical properties of a weight measurement process of the balance, wherein the parameter values belong to the group consisting of repeatability, uncertainty, relative uncertainty, confidence level and minimum weight, and means for determining and outputting a measuring value and for supplementing each individual independent measuring value with an additional value determined from a statistical quantity connected to the parameter values, wherein the statistical quantity belongs to the group consisting of standard deviation, mean value, relative standard deviation, minimum and maximum, and higher statistical moments of the measurement values.

2. The balance according to claim 1, wherein the stored data include configuration parameters and wherein the signal processing module further provides an output of at least one configuration parameter.

3. The balance according to claim 1, wherein the parameter values can be preset through the input unit.

4. The balance according to claim 1, wherein the data that form the basis of the determination belong to the group consisting of data obtained and stored in measurements performed at the location where the balance is being used, data obtained and stored in measurements performed in the manufacture of the balance, and data derived from the stored model specifications of the balance.

5. The balance according to claim 1, wherein the signal processing module, on the basis of a given first parameter value selected from the group of parameter values that consists of uncertainty and confidence level, determines for each individual measurement the respective second value from the same group.

6. The balance according to claim 1, wherein the signal processing module determines the minimum allowable weight of the object to be weighed, based on a given relative uncertainty an a given level of confidence.

7. The balance according to claim 1, wherein the signal processing module determines the required standard deviation based on a given uncertainty and a given level of confidence.

8. The balance according to claim 1, wherein the signal processing module determines the required standard deviation based on a given relative uncertainty, a given level of confidence and a weight of an object that has been weighed.

9. The balance according to claim 7 or 8, wherein the the signal processing module further determines a comparative indicator value between the repeatability and the required standard deviation.

10. The balance according to claim 1, wherein the signal processing module determines the additional values based on an expanded set of data that additionally includes information on systematic deviations comprising in particular non-linearity and sensitivity to eccentric loading.

11. The balance according to claim 10, wherein the data on systematic deviations belong to the group consisting of data obtained and stored in measurements performed at the location where the balance is being used, data obtained and stored in measurements performed in the manufacture of the balance, and data derived from the stored model specifications of the balance.

12. The balance according to claim 1, wherein the signal processing module further comprises means for carrying out a weighing cycle to be performed n times in which a measurement value of a test load of a weight freely selectable within the weighing range set down on the weighing pan and completely removed again is determined and the measurement value is retained by the balance when the test load is removed from the weighing pan, the measurement values are accumulated in a measurement series of n weighing cycles, and at least one statistical quantity is calculated based on the measurement series.

13. The balance according to claim 12, wherein the signal processing unit stores the at least one statistical quantity for use in subsequent measurements.

14. The balance according to claim 12, wherein the object to be weighed is the test load.

15. The balance according to claim 12, wherein the stored data include the number n of the weighing cycles in the measurement series for retrieval by the signal processing module.

16. The balance according to claim 7, wherein the number n is preset through the input unit.

17. The balance according to claim 7, wherein the measurement series is terminated before the number of weighing cycles has reached the stored number n.

18. The balance according to claim 9, wherein the signal processing module in the course of the measurement series continuously calculates the repeatability and causes the measurement series to be terminated at the point where the repeatability has been verified to be less than a specified target value.

19. The balance according to claim 9, wherein the signal processing module in the course of the measurement series continuously calculates the repeatability and indicates how many additional weighing cycles are needed to determine whether the repeatability is less than the specified target value.

20. The balance according to claim 18 or 19 wherein the stored data include configuration parameters and, wherein the signal processing module causes the configuration parameters to be changed depending on the result of the repeatability calculation.

21. The balance according to claim 12 wherein the signal processing module determines additional values based on the at least one statistical quantity as well as on a specified model of the probability density function of the measurement values and on parameter values connected with the probability density function.

22. The balance according to claim 21, wherein the signal processing module, on the basis of the additional values, validates the model of the probability density function of the measurement values and modifies the model if necessary.

23. The balance according to claim 21, wherein the signal processing module delivers at least one output value belonging to the group that consists of the additional values and the parameter values connected with the probability density function.

* * * * *